US011912401B2

(12) United States Patent
Georgin

(10) Patent No.: US 11,912,401 B2
(45) Date of Patent: Feb. 27, 2024

(54) AIRCRAFT BRAKE SYSTEM

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 166 days.

(21) Appl. No.: 17/469,674

(22) Filed: Sep. 8, 2021

(65) Prior Publication Data

US 2023/0074911 A1     Mar. 9, 2023

(51) Int. Cl.
*B64C 25/46* (2006.01)
*F16D 55/40* (2006.01)
*F16D 65/18* (2006.01)
*F16D 121/04* (2012.01)

(52) U.S. Cl.
CPC .............. *B64C 25/46* (2013.01); *F16D 55/40* (2013.01); *F16D 65/186* (2013.01); *F16D 2121/04* (2013.01)

(58) Field of Classification Search
CPC ...... F16D 55/40; F16D 65/183; F16D 65/186; F16D 66/027; F16D 66/025; F16D 2066/003; F16D 2121/04; B60T 7/042; B60T 7/12; B60T 8/171; B60T 8/321; B60T 8/885; B60T 8/325; B60T 8/1703; B60T 13/662; B60T 13/741; B60T 13/745; B60T 17/18; B60T 17/22; B60T 17/221; B60T 2270/40; B60T 2270/82; B60T 2270/402; B60T 2270/403; B60T 2270/404; B60T 2270/413; B64C 25/44; B64C 25/46

USPC ........................................................ 188/71.5
See application file for complete search history.

(56) References Cited

U.S. PATENT DOCUMENTS

| | | |
|---|---|---|
| 3,937,526 A | 2/1976 | Ruof |
| 5,456,523 A | 10/1995 | Boehringer |
| 10,800,387 B1 | 10/2020 | Georgin |
| 2007/0084682 A1 | 4/2007 | Griffith et al. |
| 2010/0292889 A1* | 11/2010 | Cahill ............... B60T 8/885 |
| | | 701/29.1 |
| 2013/0175403 A1* | 7/2013 | Spray ............... B60T 8/1703 |
| | | 244/110 A |
| 2017/0197606 A1* | 7/2017 | Kipp ................. B60T 8/885 |
| 2018/0099650 A1* | 4/2018 | Jones ................ B60T 7/042 |
| 2019/0023253 A1* | 1/2019 | Cahill ............... B60T 8/171 |
| 2019/0120302 A1 | 4/2019 | Cooley |
| 2020/0307530 A1* | 10/2020 | Georgin .......... B60T 17/22 |

(Continued)

OTHER PUBLICATIONS

European Patent Office, European Search Report dated Feb. 1, 2023 in Application No. 22192348.5.

*Primary Examiner* — Robert A. Siconolfi
*Assistant Examiner* — San M Aung
(74) *Attorney, Agent, or Firm* — SNELL & WILMER L.L.P.

(57) ABSTRACT

A braking system includes a brake stack; a first brake cavity operably coupled to the brake stack, the first brake cavity including a first plurality of brake actuators; a second brake cavity operably coupled to the brake stack, the second brake cavity including a second plurality of brake actuators; and a brake control module, the brake control module being configured to activate either the first plurality of brake actuators or both the first plurality of brake actuators and the second plurality of brake actuators in response to an input brake load.

20 Claims, 5 Drawing Sheets

(56) References Cited

U.S. PATENT DOCUMENTS

2020/0317327 A1\* 10/2020 Arsenault ............... B64C 25/44
2021/0179261 A1    6/2021 Arsenault et al.

\* cited by examiner

AIRCRAFT BRAKE SYSTEM

FIELD

The present disclosure relates generally to aircraft wheel and brake assemblies and, more particularly, to systems and methods configured to reduce brake grab and improve antiskid performance on slippery runways.

BACKGROUND

Aircraft typically utilize brake systems on wheels to slow or stop the aircraft during landings, taxiing and emergency situations, such as, for example, a rejected takeoff (RTO), which generally refers to engagement of a brake system during an aborted takeoff and involves high braking loads over a short period of time, resulting in a rapid increase in the brake temperature. The brake systems generally employ a heat sink comprising a series of friction disks, sandwiched between a pressure plate and an end plate, that may be forced into sliding contact with one another during a brake application to slow or stop the aircraft. A typical hydraulic brake system may include, without limitation, a source of pressurized hydraulic fluid, an actuator for exerting a force across the heat sink (e.g., across the pressure plate, the series of friction disks and the end plate), a valve for controlling a pressure level provided to the actuator and a brake control unit for receiving inputs from an operator and from various feedback mechanisms and for producing responsive outputs to the valve.

Upon activation of the brake system (e.g., by depressing a brake pedal), a pressurized fluid is applied to the actuator, which may comprise a piston configured to translate the pressure plate toward the end plate. Typically, there will, however, be some displacement of the brake components (e.g., translation of the piston and the various components of the heat sink) prior to a force being established across the components of the heat sink, at which point a brake force is exerted against the wheels to slow the aircraft. Consequently, a measured pressure level at the actuator, used for feedback to the brake control unit, may be very low for a period of time until the force is actually established across the heat sink. As a result, there may exist a short period of time or a lag following activation of the brake system where a brake command signal output by the brake control unit does not generate an actual brake engagement.

The condition just described is sometimes referred to as brake fill. During the lag associated with brake fill, the brake control unit may instruct the valve (e.g., via a brake command signal) to open further to generate an actual brake engagement (e.g., a slowing torque applied to a wheel). This may occur, for example, if the brake control unit includes an integrator that accumulates the product of error and time. As time passes without error reduction (or without feedback indicating an actual brake engagement), the brake control unit may continue to increase the level of the brake command signal being output to the valve, thereby increasing the pressure level to the actuator. Once the force is finally established across the heat sink, an actual brake engagement will occur, but such will be in response to the increased brake command signal. The increased brake command signal is the result of the accumulated error during the brake fill condition and typically results in greater braking than is desired until the brake control unit recovers and outputs a reduced brake command signal more representative of a desired or input level of braking. Brake fill may thus result in unwanted grabbing (or brake grab) or jerky brake performance and may be present with any type of braking system (e.g., hydraulic, pneumatic or electromechanical). Similarly, on slippery runways where, for example, snow or ice is present, the antiskid controls typically modulate the loads within the brake stack at a relatively low pressure (e.g., when using a hydraulic system), on the order of 100 to 150 psi (≈690 to 1035 kPa) above the contact pressure. The resulting torque generated by the brake stack may cause an undesirable and repeated increase and decrease of pressure applied at the brake stack, resulting in difficulties for the antiskid control systems and diminished brake performance.

SUMMARY

A first braking system is disclosed. In various embodiments, the braking system includes a brake stack; a first brake cavity operably coupled to the brake stack, the first brake cavity including a first plurality of brake actuators; a second brake cavity operably coupled to the brake stack, the second brake cavity including a second plurality of brake actuators; and a brake control module, the brake control module being configured to activate either the first plurality of brake actuators or both the first plurality of brake actuators and the second plurality of brake actuators in response to an input brake load.

In various embodiments, the brake control module includes a first servo valve fluidly coupled to the first brake cavity and a second servo valve fluidly coupled to the second brake cavity. In various embodiments, the first plurality of brake actuators is fluidly coupled to the first servo valve via a first hydraulic line. In various embodiments, the second plurality of brake actuators is fluidly coupled to the second servo valve via a second hydraulic line.

In various embodiments, the brake control module is configured to activate the first plurality of brake actuators in response to the input brake load being less than a threshold brake load. In various embodiments, the brake control module is configured to activate both the first plurality of brake actuators and the second plurality of brake actuators in response to the input brake load being greater than the threshold brake load. In various embodiments, the first plurality of brake actuators is interspaced between the second plurality of brake actuators. In various embodiments, the threshold brake load is within a range from about 200 psi to about 400 psi. In various embodiments, the threshold brake load is about 300 psi.

A second braking system is disclosed. In various embodiments, the braking system includes a brake stack; a first brake mechanism coupled to a first wheel, the first brake mechanism including a first brake cavity operably coupled to the brake stack, the first brake cavity including a first plurality of brake actuators, and a second brake cavity operably coupled to the brake stack, the second brake cavity including a second plurality of brake actuators; a brake control module; and a first directional control valve disposed between the brake control module and the second brake cavity, the first directional control valve being configured to activate the second plurality of brake actuators in response to an input brake load being greater than a threshold brake load.

In various embodiments, the brake control module includes a first servo valve fluidly coupled to the first brake cavity and to the second brake cavity. In various embodiments, the first directional control valve is configured to block a hydraulic fluid from activating the second plurality of brake actuators within the second brake cavity and to connect the second plurality of brake actuators to a hydraulic fluid return reservoir in response to the input brake load being less than the threshold brake load. In various embodiments, the first directional control valve is configured to route the hydraulic fluid to the second brake cavity in response to the input brake load being greater than the threshold brake load.

In various embodiments, the brake control module includes a second servo valve fluidly coupled to a second brake mechanism coupled to a second wheel. In various embodiments, a second directional control valve is disposed between the second servo valve and the second brake mechanism. In various embodiments, the first plurality of brake actuators is interspaced between the second plurality of brake actuators. In various embodiments, the threshold brake load is within a range from about 200 psi to about 400 psi.

A method of braking a vehicle having a brake stack connected to a wheel is disclosed. In various embodiments, the method includes applying an input brake load to a braking system having a first plurality of brake actuators and a second plurality of brake actuators operably coupled to the brake stack and powered by a brake control module; activating the first plurality of brake actuators in response to the input brake load being less than a threshold brake load; and activating both the first plurality of brake actuators and the second plurality of brake actuators in response to the input brake load being greater than the threshold brake load.

In various embodiments, the brake control module includes a first servo valve fluidly coupled to the first plurality of brake actuators and a second servo valve fluidly coupled to the second plurality of brake actuators. In various embodiments, a directional control valve is disposed between the brake control module and the second plurality of brake actuators and configured to activate the second plurality of brake actuators in response to the input brake load being greater than the threshold brake load.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
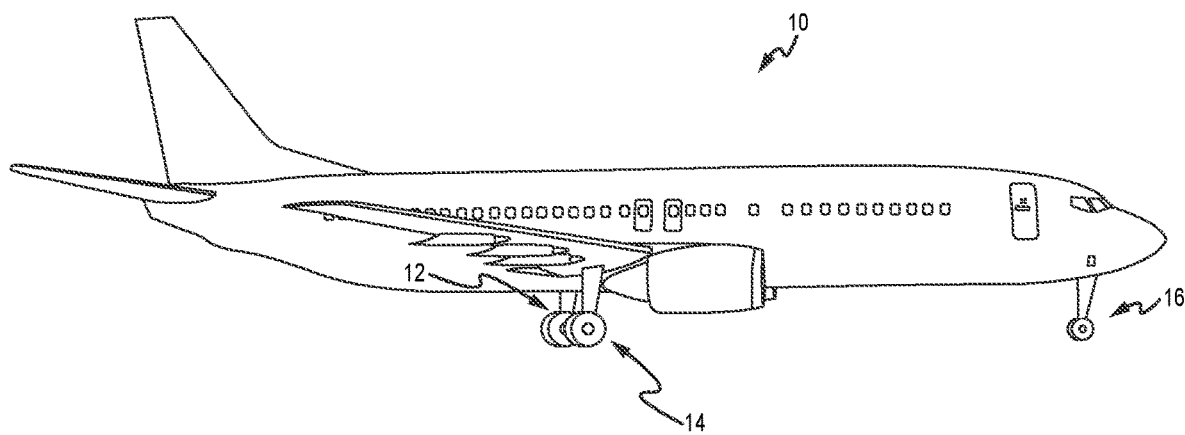
FIG. 1A illustrates an exemplary aircraft having a brake system, in accordance with various embodiments.
Figure 1B:
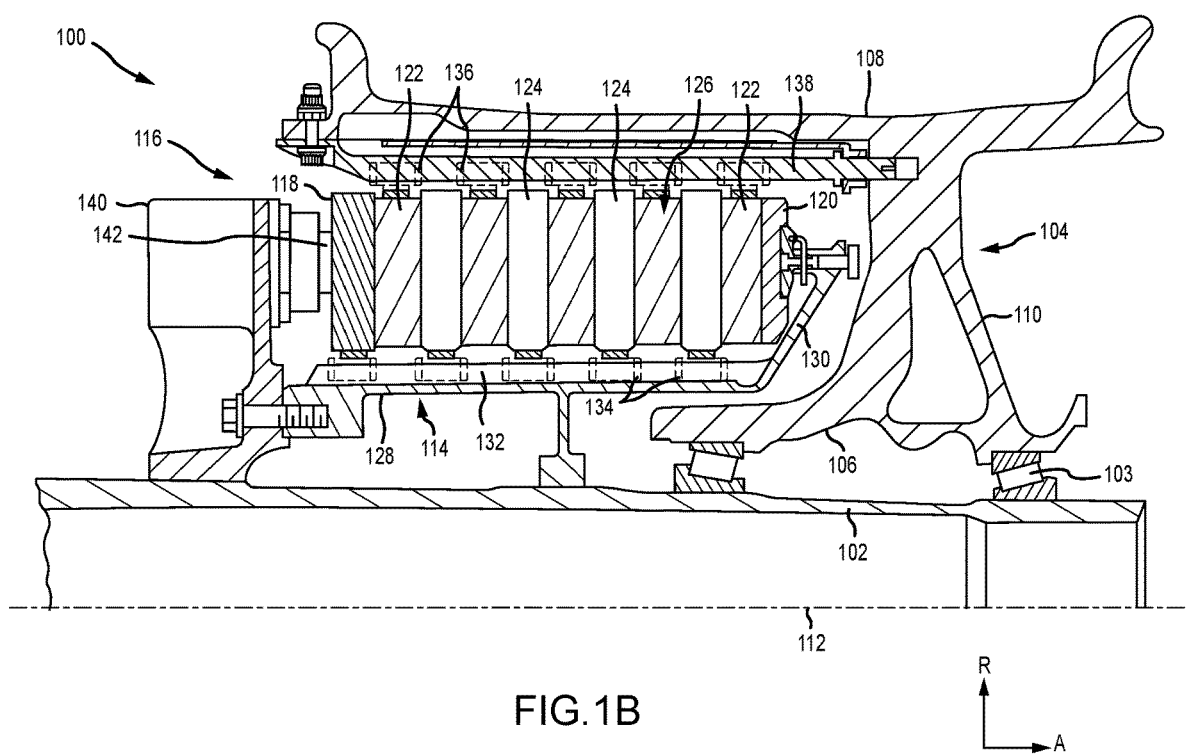
FIG. 1B illustrates a cross-sectional view of a brake mechanism, in accordance with various embodiments.

Referring now to the drawings, FIG. 1A illustrates an aircraft 10 in accordance with various embodiments. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism 100 is mounted relative to an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate 114 (sometimes referred to as a torque tube) is aligned concentrically with the wheel 104, which is rotatable relative to the torque plate 114.

The brake mechanism 100 includes a piston housing assembly 116, a pressure plate 118 disposed adjacent the piston housing assembly 116, an end plate 120 positioned a distal location from the piston housing assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake stack 126 (or a brake heat sink). The pressure plate 118, the end plate 120 and the plurality of stator disks 124 are connected to the torque plate 114 and remain rotationally stationary relative to the axle 102. The plurality of rotor disks 122 is connected to the wheel 104 and rotates relative to the pressure plate 118, the end plate 120 and the plurality of stator disks 124 and about the central axis 112.

The torque plate 114 may include an annular barrel or torque tube 128 and an annular plate or back leg 130. The back leg 130 is disposed at an end distal from the piston housing assembly 116 and may be made monolithic with the torque plate 114, as illustrated in FIG. 1B, or may be made as a separate annular piece and suitably connected to the torque tube 128. The torque plate 114 has a plurality of circumferentially spaced and axially extending splines 132 disposed on an outer surface of the torque tube 128. The plurality of stator disks 124 and the pressure plate 118 include notches or slots 134 on an inner periphery of each of the disks and the pressure plate 118 for engagement with the splines 132, such that each disk and the pressure plate 118 is axially slidable with respect to the torque tube 128. The end plate 120 is suitably connected to the back leg 130 of the torque plate 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or slots 136 along an outer periphery of each disk for engagement with a plurality of torque bars 138 that are secured to or made monolithic with an inner periphery of the wheel 104.

An actuating mechanism for the brake mechanism 100 includes a plurality of piston assemblies, circumferentially spaced around a piston housing 140 (only one piston assembly is illustrated in FIG. 1B). Each of the plurality of piston assemblies includes a piston 142 configured to apply a load against the pressure plate 118. Upon actuation, the plurality of piston assemblies affects a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

Figure 2:
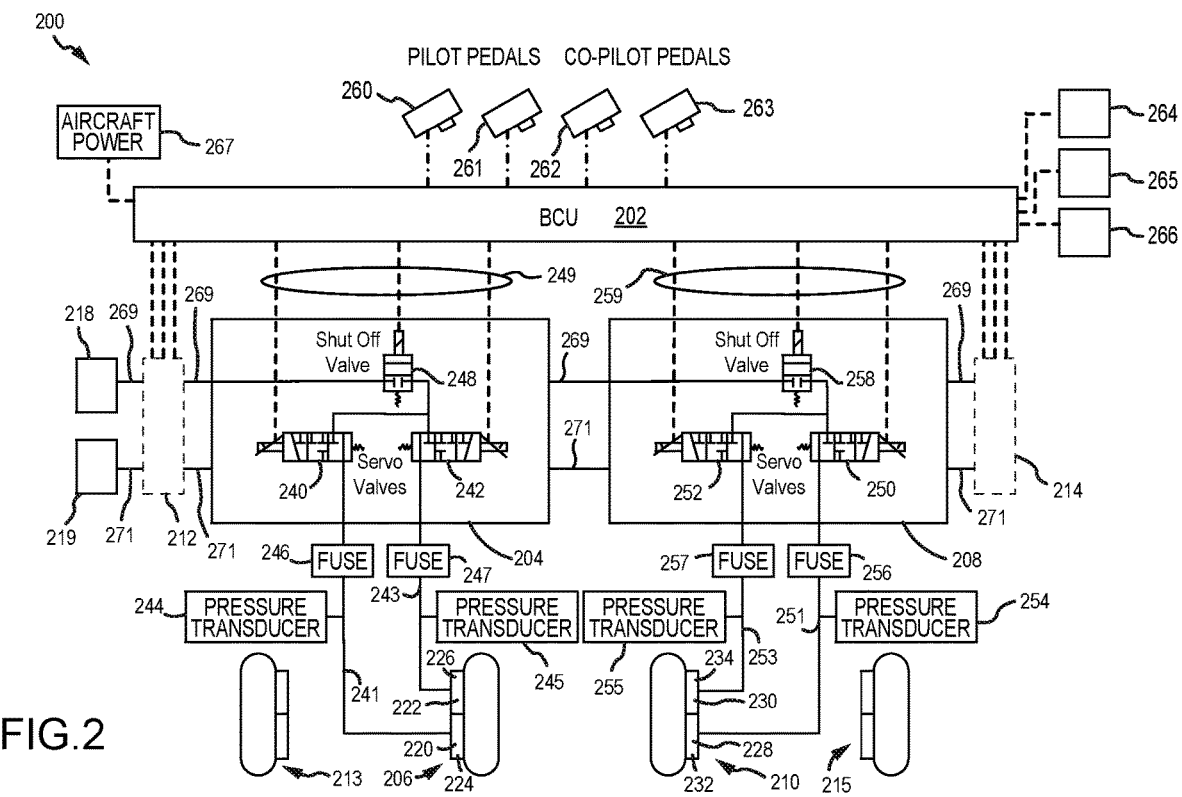
FIG. 2 illustrates a schematic view of a brake system, in accordance with various embodiments.

Referring now to FIG. 2, a braking system 200 is illustrated, in accordance with various embodiments. The braking system 200 includes a brake control unit 202 (BCU), which is programmed to control the various braking functions described herein. In various embodiments, the braking system 200 enables an aircraft to brake, thereby slowing or stopping the aircraft when landing or taxiing on the ground. However, it will be appreciated that the braking system 200 may also be used in connection with other types of vehicles without departing from the scope of the disclosure. As explained in further detail below, the braking system 200 generally includes a first brake control module 204 configured to operate a left inboard brake mechanism 206 (or a first brake mechanism) coupled to a first wheel and a second brake control module 208 configured to operate a right inboard brake mechanism 210 (or a second brake mechanism) coupled to a second wheel. In similar fashion, the braking system 200 may include a third brake control module 212 configured to operate a left outboard brake mechanism 213 and a fourth brake control module 214 configured to operate a right outboard brake mechanism 215. Because the outboard braking system operates in identical fashion to the inboard braking system, only construction and operation of the inboard braking system is described herein for brevity.

As described herein, the braking system 200 generally includes a hydraulic fluid source 218 configured to provide a pressurized hydraulic fluid to each of the left inboard brake mechanism 206 and the right inboard brake mechanism 210 via, respectively, the first brake control module 204 and the second brake control module 208. The left inboard brake mechanism 206 comprises a first dual cavity brake mechanism, which includes a first left inboard brake cavity 220 (or a first brake cavity) and a second left inboard brake cavity 222 (or a second brake cavity). Both the first left inboard brake cavity 220 and the second left inboard brake cavity 222 share constructional and operational characteristics of the piston housing assembly 116 described above. Note, in various embodiments, the first left inboard brake cavity 220 and the second left inboard brake cavity 222 may comprise a single monolithic unit or separate units. The first left inboard brake cavity 220 comprises a first plurality of left inboard brake actuators 224 (or a first plurality of brake actuators) and a second plurality of left inboard brake actuators 226 (or a second plurality of brake actuators). Generally, each of the first plurality of left inboard brake actuators 224 and the second plurality of left inboard brake actuators 226 comprises a piston (e.g., the piston 142 described above) configured to apply a load against a left inboard pressure plate (e.g., the pressure plate 118 described above). In various embodiments, the members comprising the first plurality of left inboard brake actuators 224 are interspaced about the left inboard pressure plate with the members comprising the second plurality of left inboard brake actuators 226. For example, in embodiments where the left inboard brake mechanism 206 comprises a total of eight actuators, the four members comprising the first plurality of left inboard brake actuators 224 (or a first set of brake actuators) may be positioned at 0°, 90°, 180° and 270° about the left inboard pressure plate while the four members comprising the second plurality of left inboard brake actuators 226 (or a second set of brake actuators) may be positioned at 45°, 135°, 225° and 315° about the left inboard pressure plate. The interspacing of the brake actuators as described provides a balanced load against the left inboard pressure plate when one or both of the first plurality of left inboard brake actuators 224 and the second plurality of left inboard brake actuators 226 is actuated.

Similarly, the right inboard brake mechanism 210 comprises a second dual cavity brake mechanism, which includes a first right inboard brake cavity 228 and a second right inboard brake cavity 230. Both the first right inboard brake cavity 228 and the second right inboard brake cavity 230 share constructional and operational characteristics of the piston housing assembly 116 described above. Note, in various embodiments, the first right inboard brake cavity 228 and the second right inboard brake cavity 230 may comprise a single monolithic unit or separate units. The first right inboard brake cavity 228 comprises a first plurality of right inboard brake actuators 232 and a second plurality of right inboard brake actuators 234. Generally, each of the first plurality of right inboard brake actuators 232 and the second plurality of right inboard brake actuators 234 comprises a piston (e.g., the piston 142 described above) configured to apply a load against a right inboard pressure plate (e.g., the pressure plate 118 described above). In a manner similar to the above description, the members comprising the first plurality of right inboard brake actuators 232 are interspaced about the right inboard pressure plate with the members comprising the second plurality of right inboard brake actuators 234. For example, in embodiments where the right inboard brake mechanism 210 comprises a total of eight actuators, the four members comprising the first plurality of right inboard brake actuators 232 may be positioned at 0°, 90°, 180° and 270° about the right inboard pressure plate while the four members comprising the second plurality of right inboard brake actuators 234 may be positioned at 45°, 135°, 225° and 315° about the right inboard pressure plate. The interspacing of the brake actuators as described provides a balanced load against the right inboard pressure plate when one or both of the first plurality of right inboard brake actuators 232 and the second plurality of right inboard brake actuators 234 is actuated.

Still referring to FIG. 2, the first left inboard brake cavity 220, which comprises the first plurality of left inboard brake actuators 224, is fluidly coupled to the hydraulic fluid source 218 via a first left inboard servo valve 240 (or a first servo valve) and a first left inboard hydraulic line 241 (or a first hydraulic line), while the second left inboard brake cavity 222, which comprises the second plurality of left inboard brake actuators 226, is fluidly coupled to the hydraulic fluid source 218 via a second left inboard servo valve 242 (or a second servo valve) and a second left inboard hydraulic line 243 (or a second hydraulic line). A first left inboard pressure transducer 244 is configured to monitor the fluid pressure within the first left inboard hydraulic line 241 and a second left inboard pressure transducer 245 is configured to monitor the fluid pressure within the second left inboard hydraulic line 243. A first left inboard fuse 246 is configured to stop the flow of hydraulic fluid to the first left inboard brake cavity 220 in the event of a loss of fluid pressure within the first left inboard hydraulic line 241 indicative of a failure within the first left inboard hydraulic system. Similarly, a second left inboard fuse 247 is configured to stop the flow of hydraulic fluid to the second left inboard brake cavity 222 in the event of a loss of fluid pressure within the second left inboard hydraulic line 243 indicative of a failure within the second left inboard hydraulic system. A primary hydraulic line 269 fluidly couples the hydraulic fluid source 218 to the first left inboard servo valve 240 and to the second left inboard servo valve 242. A left inboard shutoff valve 248 is configured to turn on or shut off the flow of hydraulic fluid to the first left inboard servo valve 240 and to the second left inboard servo valve 242.

Similarly, the first right inboard brake cavity 228, which comprises the first plurality of right inboard brake actuators 232, is fluidly coupled to the hydraulic fluid source 218 via a first right inboard servo valve 250 and a first right inboard hydraulic line 251, while the second right inboard brake cavity 230, which comprises the second plurality of right inboard brake actuators 234, is fluidly coupled to the hydraulic fluid source 218 via a second right inboard servo valve 252 and a second right inboard hydraulic line 253. A first right inboard pressure transducer 254 is configured to monitor the fluid pressure within the first right inboard hydraulic line 251 and a second right inboard pressure transducer 255 is configured to monitor the fluid pressure within the second right inboard hydraulic line 253. A first right inboard fuse 256 is configured to stop the flow of hydraulic fluid to the first right inboard brake cavity 228 in the event of a loss of fluid pressure within the first right inboard hydraulic line 251 indicative of a failure within the first right inboard hydraulic system. Similarly, a second right inboard fuse 257 is configured to stop the flow of hydraulic fluid to the second right inboard brake cavity 230 in the event of a loss of fluid pressure within the second right inboard hydraulic line 253 indicative of a failure within the second right inboard hydraulic system. The primary hydraulic line 269 fluidly couples the hydraulic fluid source 218 to the first right inboard servo valve 250 and to the second right inboard servo valve 252. A right inboard shutoff valve 258 is configured to turn on or shut off the flow of hydraulic fluid to the first right inboard servo valve 250 and to the second right inboard servo valve 252.

During operation, the brake control unit 202 receives brake command signals from a left pilot brake pedal 260 and a right pilot brake pedal 261 or a left co-pilot brake pedal 262 and a right co-pilot brake pedal 263. The brake command signals from the left pilot brake pedal 260 and the right pilot brake pedal 261 or the left co-pilot brake pedal 262 and the right co-pilot brake pedal 263 are indicative of a desired amount of braking (or an input brake load). In addition, the brake control unit 202 receives control signals from an auto-brake interface 264 for performing auto-brake and rejected take-off (RTO) braking functions. The brake control unit 202 also receives a series of discrete control signals associated with the aircraft, generally represented as aircraft discretes 265, for providing braking control thereof. In various embodiments, the braking system 200 further includes an output device 266 (e.g., a display) coupled to the brake control unit 202. The output device 266 is configured to communicate information to the pilot or the co-pilot or to maintenance crew relating to the braking operations. For example, in various embodiments, the output device 266 includes a gauge, a speaker or a network access communication port configured to provide a message to a remote terminal. In various embodiments, the brake control unit 202 controls the output device 266 to output a health status of the braking system 200 or the various components thereof. Power to the brake control unit 202 may be provided from an aircraft power source 267, such as, for example, a 28-Volt DC power source within the aircraft.

In various embodiments, the brake control unit 202 controls operation of the left inboard brake mechanism 206 and the right inboard brake mechanism 210. Focusing on the left inboard brake mechanism 206, for example, the brake control unit 202 is configured to operate the first left inboard brake cavity 220 (or the first plurality of left inboard brake actuators 224) independently of the second left inboard brake cavity 222 (or the second plurality of left inboard brake actuators 226). For example, when the brake control unit 202 receives brake command signals indicating a light brake load (e.g., a brake load equal to or less than a threshold brake load), the brake control unit 202 instructs the first left inboard servo valve 240 to open, thereby activating only the first plurality of left inboard brake actuators 224. By default, the second left inboard servo valve 242, during a light brake load mode of operation, is configured to block high-pressure hydraulic fluid from reaching the second left inboard brake cavity 222 and to instead connect the second left inboard brake cavity 222 back to a hydraulic fluid return reservoir 219 via a fluid return hydraulic line 271, ensuring the fluid pressure within the second left inboard hydraulic line 243 and second left inboard brake cavity 222 remains at or below a return or a reservoir pressure. On the other hand, when the brake control unit 202 receives brake command signals indicating a heavy brake load (e.g., a brake load greater than the threshold brake load), the brake control unit 202 instructs both the first left inboard servo valve 240 and the second left inboard servo valve 242 to open, thereby activating both the first plurality of left inboard brake actuators 224 and the second plurality of left inboard brake actuators 226. Under either mode of operation, i.e., the light brake load mode or the heavy brake load mode, the brake control unit 202 will also control the opening of the left inboard shutoff valve 248. In various embodiments, the brake control unit 202 controls operation of the left inboard shutoff valve 248, the first left inboard servo valve 240 and the second left inboard servo valve 242, via control signals sent over a left inboard bus 249. Note the degree to which the first left inboard servo valve 240 is opened will always be consistent with the desired brake load (or input brake load), regardless of whether the desired brake load is less than or equal to or greater than the threshold brake load as measured by the hydraulic pressure acting on the brake actuators (e.g., 300 psi or ≈2,070 kPa). On the other hand, the degree to which the second left inboard servo valve 242 is opened will depend on whether the desired brake load is less than or equal to or greater than the threshold brake load. For example, when the desired brake load is less than or equal to the threshold brake load, the second left inboard servo valve 242 will remain closed and when the desired brake load is greater than the threshold brake load, the degree to which the second left inboard servo valve 242 is opened will be consistent with the desired brake load. In various embodiments, the threshold brake load translates to a hydraulic pressure within a range from about 200 psi (≈1380 kPa) to about 400 psi (≈2760 kPa).

Focusing now on the right inboard brake mechanism 210, the brake control unit 202 is configured to operate the first right inboard brake cavity 228 (or the first plurality of right inboard brake actuators 232) independently of the second right inboard brake cavity 230 (or the second plurality of right inboard brake actuators 234). For example, in response to the brake control unit 202 receiving brake command signals indicating a light brake load (e.g., a brake load equal to or less than a threshold brake load), the brake control unit 202 instructs the first right inboard servo valve 250 to open, thereby activating only the first plurality of right inboard brake actuators 232. By default, the second right inboard servo valve 252, during a light brake load mode of operation, is configured to block high-pressure hydraulic fluid from reaching the second right inboard brake cavity 230 and to instead connect the second right inboard brake cavity 230 back to the hydraulic fluid return reservoir 219 via the fluid return hydraulic line 271, ensuring the fluid pressure within the second right inboard hydraulic line 253 and the second right inboard brake cavity 230 remains at or below a return or a reservoir pressure. On the other hand, in response to brake control unit 202 receiving brake command signals indicating a heavy brake load (e.g., a brake load greater than the threshold brake load), the brake control unit 202 instructs both the first right inboard servo valve 250 and the second right inboard servo valve 252 to open, thereby activating both the first plurality of right inboard brake actuators 232 and the second plurality of right inboard brake actuators 234. Under either mode of operation, i.e., the light brake load mode or the heavy brake load mode, the brake control unit 202 will also control the opening of the right inboard shutoff valve 258. In various embodiments, the brake control unit 202 controls operation of the right inboard shutoff valve 258, the first right inboard servo valve 250 and the second right inboard servo valve 252, via control signals sent over a right inboard bus 259. Note the degree to which the first right inboard servo valve 250 is opened will always be consistent with the desired brake load, regardless of whether the desired brake load is less than or equal to or greater than the threshold brake load as measured by the hydraulic pressure acting on the brake actuators (e.g., 300 psi or ≈2,070 kPa). On the other hand, the degree to which the second right inboard servo valve 252 is opened will depend on whether the desired brake load is less than or equal to or greater than the threshold brake load. For example, when the desired brake load is less than or equal to the threshold brake load, the second right inboard servo valve 252 will remain closed and when the desired brake load is greater than the threshold brake load, the degree to which the second right inboard servo valve 252 is opened will be consistent with the desired brake load. In various embodiments, the threshold brake load translates to a hydraulic pressure within a range from about 200 psi (≈1380 kPa) to about 400 psi (≈2760 kPa).

The foregoing embodiments—e.g., the braking system 200—provide a system that reduces unwanted grabbing (or brake grab) or jerky brake performance and improves antiskid performance by controlling the amount of torque applied to a wheel during a braking operation. For example, when operating below the threshold brake load, the brake control unit 202 is configured to open a single servo valve in each brake control module. This results in the desired brake load—via the hydraulic pressure applied to the actuators—being applied, for example, by one-half the actuators present in each brake mechanism, which further results in one-half the torque being applied to the wheel connected to each brake mechanism. When operating below the threshold brake load, finer control of wheel deceleration is also achieved in antiskid mode on icy or slippery runways because the antiskid system may modulate braking with less gain since the torque being applied to each wheel is halved or lessened when compared to operating above the threshold brake load. Above the threshold brake load, all servo valves are opened, providing the full torque applied by the actuators present in each brake mechanism. Note the foregoing embodiment will typically be associated with a minimum of four brake control modules for operating a typical braking system having four sets of wheels, as illustrated in FIG. 2, as opposed to two brake control modules for the same braking system having four wheels—a first brake control module for the inboard wheels and a second brake control module for the outboard wheels. The following embodiment, which provides the same benefits, is accomplished using two brake control modules, rather than four.

Figure 3:
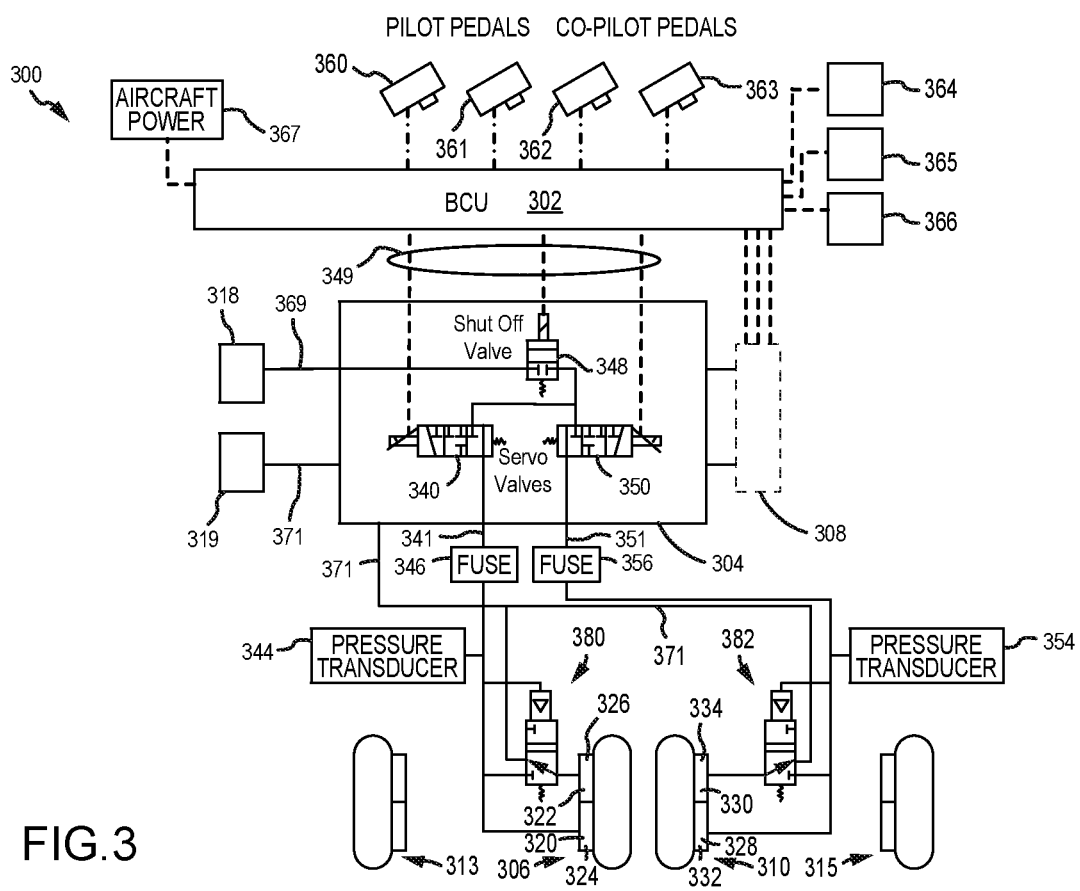
FIG. 3 illustrates a schematic view of a brake system, in accordance with various embodiments.

Referring now to FIG. 3, a braking system 300 is illustrated, in accordance with various embodiments. The braking system 300 includes a brake control unit 302 (BCU), which is programmed to control the various braking functions described herein. In various embodiments, the braking system 300 enables an aircraft to brake, thereby slowing or stopping the aircraft when landing or taxiing on the ground. However, it will be appreciated that the braking system 300 may also be used in connection with other types of vehicles without departing from the scope of the disclosure. As explained in further detail below, the braking system 300 generally includes a brake control module 304 configured to operate a left inboard brake mechanism 306 (or a first brake mechanism) coupled to a first wheel and a right inboard brake mechanism 310 (or a second brake mechanism) coupled to a second wheel. In similar fashion, the braking system 300 may include a second brake control module 308 configured to operate a left outboard brake mechanism 313 and a right outboard brake mechanism 315. Because the outboard braking system operates in identical fashion to the inboard braking system, only construction and operation of the inboard braking system is described herein for brevity.

As described herein, the braking system 300 generally includes a hydraulic fluid source 318 configured to provide a pressurized hydraulic fluid to each of the left inboard brake mechanism 306 and the right inboard brake mechanism 310 via the brake control module 304. The left inboard brake mechanism 306 comprises a first dual cavity brake mechanism, which includes a first left inboard brake cavity 320 (or a first brake cavity) and a second left inboard brake cavity 322 (or a second brake cavity). Both the first left inboard brake cavity 320 and the second left inboard brake cavity 322 share constructional and operational characteristics of the piston housing assembly 116 described above. Note, in various embodiments, the first left inboard brake cavity 320 and the second left inboard brake cavity 322 may comprise a single monolithic unit or separate units. The first left inboard brake cavity 320 comprises a first plurality of left inboard brake actuators 324 and the second left inboard brake cavity 322 comprises a second plurality of left inboard brake actuators 326. Generally, each of the first plurality of left inboard brake actuators 324 and the second plurality of left inboard brake actuators 326 comprises a piston (e.g., the piston 142 described above) configured to apply a load against a left inboard pressure plate (e.g., the pressure plate 118 described above). In various embodiments, the members comprising the first plurality of left inboard brake actuators 324 are interspaced about the left inboard pressure plate with the members comprising the second plurality of left inboard brake actuators 326. For example, in embodiments where the left inboard brake mechanism 306 comprises a total of eight actuators, the four members comprising the first plurality of left inboard brake actuators 324 may be positioned at 0°, 90°, 180° and 270° about the left inboard pressure plate while the four members comprising the second plurality of left inboard brake actuators 326 may be positioned at 45°, 135°, 225° and 315° about the left inboard pressure plate. The interspacing of the brake actuators as described provides a balanced load against the left inboard pressure plate when one or both of the first plurality of left inboard brake actuators 324 and the second plurality of left inboard brake actuators 326 is actuated.

Similarly, the right inboard brake mechanism 310 comprises a second dual cavity brake mechanism, which includes a first right inboard brake cavity 328 (or a first brake cavity) and a second right inboard brake cavity 330 (or a second brake cavity). Both the first right inboard brake cavity 328 and the second right inboard brake cavity 330 share constructional and operational characteristics of the piston housing assembly 116 described above. Note, in various embodiments, the first right inboard brake cavity 328 and the second right inboard brake cavity 330 may comprise a single monolithic unit or separate units. The first right inboard brake cavity 328 comprises a first plurality of right inboard brake actuators 332 and the second right inboard brake cavity 330 comprises a second plurality of right inboard brake actuators 334. Generally, each of the first plurality of right inboard brake actuators 332 and the second plurality of right inboard brake actuators 334 comprises a piston (e.g., the piston 142 described above) configured to apply a load against a right inboard pressure plate (e.g., the pressure plate 118 described above). In a manner similar to the above description, the members comprising the first plurality of right inboard brake actuators 332 are interspaced about the right inboard pressure plate with the members comprising the second plurality of right inboard brake actuators 334. For example, in embodiments where the right inboard brake mechanism 310 comprises a total of eight actuators, the four members comprising the first plurality of right inboard brake actuators 332 may be positioned at 0°, 90°, 180° and 270° about the right inboard pressure plate while the four members comprising the second plurality of right inboard brake actuators 334 may be positioned at 45°, 135°, 225° and 315° about the right inboard pressure plate. The interspacing of the brake actuators as described provides a balanced load against the right inboard pressure plate when one or both of the first plurality of right inboard brake actuators 332 and the second plurality of right inboard brake actuators 334 is actuated.

Still referring to FIG. 3, the first left inboard brake cavity 320, which comprises the first plurality of left inboard brake actuators 324, is fluidly coupled to the hydraulic fluid source 318 via a left inboard servo valve 340 and a left inboard hydraulic line 341. The second left inboard brake cavity 322, which comprises the second plurality of left inboard brake actuators 326, is also fluidly coupled to the hydraulic fluid source 318 via the left inboard servo valve 340 and the left inboard hydraulic line 341. A left inboard pressure transducer 344 is configured to monitor the fluid pressure within the left inboard hydraulic line 341. A left inboard fuse 346 is configured to stop the flow of hydraulic fluid to the left inboard brake mechanism 306 in the event of a loss of fluid pressure within the left inboard hydraulic line 341 indicative of a failure within the left inboard hydraulic system. A primary hydraulic line 369 fluidly couples the hydraulic fluid source 318 to the left inboard servo valve 340. An inboard shutoff valve 348 is configured to turn on or shut off the flow of hydraulic fluid to the left inboard servo valve 340. A left inboard directional control valve 380 (or a first directional control valve) is positioned between the second left inboard brake cavity 322 and the left inboard hydraulic line 341. When the left inboard directional control valve 380 is in an open position, the pressurized hydraulic fluid within the left inboard hydraulic line 341 is in fluid communication with and allowed to operate both the first plurality of left inboard brake actuators 324 and the second plurality of left inboard brake actuators 326 under the same pressure. On the other hand, when the left inboard directional control valve 380 is in a closed position, the pressurized hydraulic fluid that would otherwise be in fluid communication with the second plurality of left inboard brake actuators 326 is blocked and the second plurality of left inboard brake actuators 326 is instead connected via a fluid return hydraulic line 371 to a hydraulic fluid return reservoir 319, ensuring the fluid pressure within the second left inboard brake cavity 322 remains at or below a return or a reservoir pressure.

Similarly, the first right inboard brake cavity 328, which comprises the first plurality of right inboard brake actuators 332, is fluidly coupled to the hydraulic fluid source 318 via a right inboard servo valve 350 and a right inboard hydraulic line 351. The second right inboard brake cavity 330, which comprises the second plurality of right inboard brake actuators 334, is also fluidly coupled to the hydraulic fluid source 318 via the right inboard servo valve 350 and the right inboard hydraulic line 351. A right inboard pressure transducer 354 is configured to monitor the fluid pressure within the right inboard hydraulic line 351. A right inboard fuse 356 is configured to stop the flow of hydraulic fluid to the right inboard brake mechanism 310 in the event of a loss of fluid pressure within the right inboard hydraulic line 351 indicative of a failure within the right inboard hydraulic system. The primary hydraulic line 369 fluidly couples the hydraulic fluid source 318 to the right inboard servo valve 350. The inboard shutoff valve 348 is configured to turn on or shut off the flow of hydraulic fluid to the right inboard servo valve 350. A right inboard directional control valve 382 (or a second directional control valve) is positioned between the second right inboard brake cavity 330 and the right inboard hydraulic line 351. When the right inboard directional control valve 382 is in an open position, the pressurized hydraulic fluid within the right inboard hydraulic line 351 is in fluid communication with and allowed to operate both the first plurality of right inboard brake actuators 332 and the second plurality of right inboard brake actuators 334 under the same pressure. On the other hand, when the right inboard directional control valve 382 is in a closed position, the pressurized hydraulic fluid that would otherwise be in fluid communication with the second plurality of right inboard brake actuators 334 is blocked and the second plurality of right inboard brake actuators 334 is instead connected via the fluid return hydraulic line 371 to the hydraulic fluid return reservoir 319, ensuring the fluid pressure within the second right inboard brake cavity 330 remains at or below a return or a reservoir pressure.

During operation, the brake control unit 302 receives brake command signals from a left pilot brake pedal 360 and a right pilot brake pedal 361 or a left co-pilot brake pedal 362 and a right co-pilot brake pedal 363. The brake command signals from the left pilot brake pedal 360 and the right pilot brake pedal 361 or the left co-pilot brake pedal 362 and the right co-pilot brake pedal 363 are indicative of a desired amount of braking. In addition, the brake control unit 302 receives control signals from an auto-brake interface 364 for performing auto-brake and rejected take-off (RTO) braking functions. The brake control unit 302 also receives a series of discrete control signals associated with the aircraft, generally represented as aircraft discretes 365, for providing braking control thereof. In various embodiments, the braking system 300 further includes an output device 366 (e.g., a display) coupled to the brake control unit 302. The output device 366 is configured to communicate information to the pilot or the co-pilot or to maintenance crew relating to the braking operations. For example, in various embodiments, the output device 366 includes a gauge, a speaker or a network access communication port configured to provide a message to a remote terminal. In various embodiments, the brake control unit 302 controls the output device 366 to output a health status of the braking system 300 or the various components thereof. Power to the brake control unit 302 may be provided from an aircraft power source 367, such as, for example, a 28-Volt DC power source within the aircraft.

In various embodiments, the brake control unit 302 controls operation of the left inboard brake mechanism 306 and, more particularly, the brake control unit 302 is configured to operate the first left inboard brake cavity 320 (or the first plurality of left inboard brake actuators 324) independently of the second left inboard brake cavity 322 (or the second plurality of left inboard brake actuators 326). For example, when the brake control unit 302 receives brake command signals indicating a light brake load (e.g., a brake load equal to or less than a threshold brake load), the brake control unit 302 instructs both the left inboard servo valve 340 and the right inboard servo valve 350 to open, thereby supplying pressurized hydraulic fluid to both the left inboard hydraulic line 341 and the right inboard hydraulic line 351 at a low-pressure level that corresponds to a brake load less than or equal to the threshold brake load. The low-pressure level is less than the pressure required to open either the left inboard directional control valve 380 or the right inboard directional control valve 382. Because the left inboard directional control valve 380 and the right inboard directional control valve 382 are in a closed position, the pressurized hydraulic fluid that would otherwise be in fluid communication with the second plurality of left inboard brake actuators 326 and the second plurality of right inboard brake actuators 334 is blocked and the second left inboard brake cavity 322 and the second right inboard brake cavity 330 are instead connected via the fluid return hydraulic line 371 to the hydraulic fluid return reservoir 319, ensuring the fluid pressure within the second left inboard brake cavity 322 and the second right inboard brake cavity 330 remains at or below a return or a reservoir pressure. Accordingly, in such configuration, the pressurized hydraulic fluid is supplied only to the first left inboard brake cavity 320 (or the first plurality of left inboard brake actuators 324) and the first right inboard brake cavity 328 (or the first plurality of right inboard brake actuators 332) at the low-pressure level consistent with the desired brake load below the threshold brake load.

On the other hand, when the brake control unit 302 receives brake command signals indicating a heavy brake load (e.g., a brake load greater than the threshold brake load), the brake control unit 302 instructs both the left inboard servo valve 340 and the right inboard servo valve 350 to open, thereby supplying pressurized hydraulic fluid to both the left inboard hydraulic line 341 and the right inboard hydraulic line 351 at a high-pressure level that corresponds to a brake load greater than the threshold brake load. The high-pressure level is greater than the pressure required to open both the left inboard directional control valve 380 and the right inboard directional control valve 382. Because the left inboard directional control valve 380 and the right inboard directional control valve 382 are in an open position, the pressurized hydraulic fluid is now supplied to both the first left inboard brake cavity 320 (or the first plurality of left inboard brake actuators 324) and the first right inboard brake cavity 328 (or the first plurality of right inboard brake actuators 332) via, respectively, the left inboard hydraulic line 341 and the right inboard hydraulic line 351, and to both the second left inboard brake cavity 322 (or the second plurality of left inboard brake actuators 326) and the second right inboard brake cavity 330 (or the second plurality of right inboard brake actuators 332) via, respectively, the left inboard hydraulic line 341 and the right inboard hydraulic line 351 at the high-pressure level consistent with the desired brake load above the threshold brake load. Under either mode of operation, i.e., the light brake load mode or the heavy brake load mode, the brake control unit 302 controls operation of the inboard shutoff valve 348, the left inboard servo valve 340 and the right inboard servo valve 350 via control signals sent over an inboard bus 349. Note the degree to which the left inboard servo valve 340 and the right inboard servo valve 350 are opened will be consistent with the desired brake load, regardless of whether the desired brake load is less than or equal to or greater than the threshold brake load as measured by the hydraulic pressure acting on the brake actuators (e.g., 300 psi or ≈2,070 kPa). In various embodiments, the threshold brake load translates to a hydraulic pressure within a range from about 200 psi (≈1380 kPa) to about 400 psi (≈2760 kPa).

The foregoing embodiments—e.g., the braking system 300—provide a system that reduces unwanted grabbing (or brake grab) or jerky brake performance and improves anti-skid performance by controlling the amount of torque applied to a wheel during a braking operation. For example, when operating below the threshold brake load, the directional control valves are configured to remain closed, such that only the first inboard cavities are charged with pressurized hydraulic fluid. This results in the desired brake load—via the hydraulic pressure applied to the actuators—being applied, for example, by one-half the actuators present in each brake mechanism, which further results in one-half the torque being applied to the wheel connected to each brake mechanism. When operating below the threshold brake load, finer control of wheel deceleration is also achieved in antiskid mode on icy or slippery runways because the antiskid system may modulate braking with less gain since the torque being applied to each wheel is halved or lessened when compared to operating above the threshold brake load. Above the threshold brake load, the directional control valves are configured to open, such that each of the first and second inboard cavities are charged with pressurized hydraulic fluid, providing the full torque applied by the actuators present in each brake mechanism.

Figure 4:
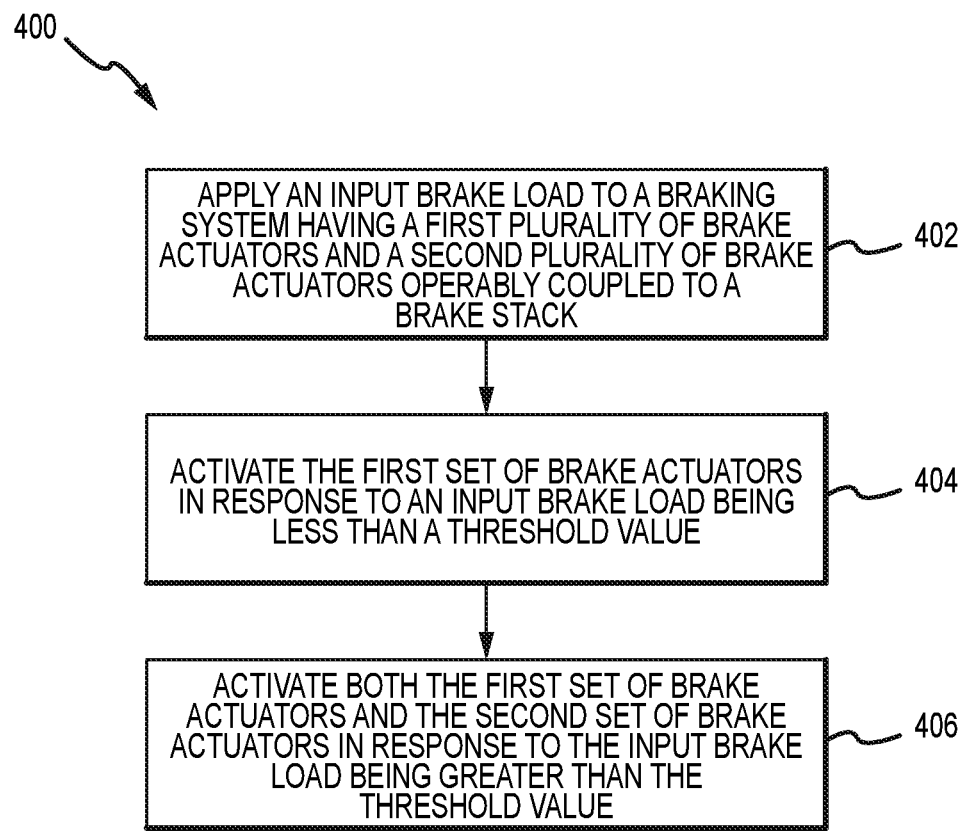
FIG. 4 describes a method of braking a vehicle having a brake stack connected to a wheel, in accordance with various embodiments.

Finally, referring to FIG. 4, a method 400 of braking a vehicle having a brake stack connected to a wheel is described as having the following steps. A first step 402 includes applying an input brake load to a braking system having a first plurality of brake actuators and a second plurality of brake actuators operably coupled to the brake stack and powered by a brake control module. A second step 404 includes activating the first set of brake actuators in response to the input brake load being less than a threshold value. A third step 406 includes activating both the first set of brake actuators and the second set of brake actuators in response to the input brake load being greater than the threshold value. In various embodiments, the brake control module includes a first servo valve fluidly coupled to the first plurality of brake actuators and a second servo valve fluidly coupled to the second plurality of brake actuators. In various embodiments, a directional control valve is disposed between the brake control module and the second plurality of brake actuators and configured to activate the second plurality of brake actuators in response to the input brake load being greater than the threshold value.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A braking system, comprising:
   a brake stack;
   a hydraulic fluid source;
   a first brake cavity operably coupled to the brake stack and fluidly coupled to the hydraulic fluid source, the first brake cavity including a first plurality of brake actuators;
   a second brake cavity operably coupled to the brake stack and fluidly coupled to the hydraulic fluid source, the second brake cavity including a second plurality of brake actuators; and
   a brake control module configured to control the first plurality of brake actuators and the second plurality of brake actuators,
   wherein the brake control module is configured to activate the first plurality of brake actuators in response to a brake command signal indicating a light brake load,
   wherein the brake control module is configured to activate both the first plurality of brake actuators and the second plurality of brake actuators in response to the brake command signal indicating a heavy brake load.

2. The braking system of claim 1, further comprising:
a first servo valve fluidly coupled between the first brake cavity and the hydraulic fluid source; and
a second servo valve fluidly coupled between the second brake cavity and the hydraulic fluid source.

3. The braking system of claim 2, wherein the first plurality of brake actuators is fluidly coupled to the first servo valve via a first hydraulic line.

4. The braking system of claim 3, wherein the second plurality of brake actuators is fluidly coupled to the second servo valve via a second hydraulic line.

5. The braking system of claim 4, wherein the brake control module is configured to activate the first plurality of brake actuators in response to the brake command signal being less than a threshold brake load.

6. The braking system of claim 5, wherein the brake control module is configured to activate both the first plurality of brake actuators and the second plurality of brake actuators in response to the brake command signal being greater than the threshold brake load.

7. The braking system of claim 6, wherein the first plurality of brake actuators is interspaced between the second plurality of brake actuators.

8. The braking system of claim 7, wherein the threshold brake load translates to a hydraulic pressure within a range from about 200 psi to about 400 psi.

9. The braking system of claim 7, wherein the threshold brake load translates to a hydraulic pressure of about 300 psi.

10. A braking system, comprising:
a brake stack;
a first brake mechanism coupled to a first wheel, the first brake mechanism including:
a first brake cavity operably coupled to the brake stack, the first brake cavity including a first plurality of brake actuators, and
a second brake cavity operably coupled to the brake stack, the second brake cavity including a second plurality of brake actuators;
a brake control module; and
a first directional control valve disposed between the brake control module and the second brake cavity and configured to move from a closed position to an open position,
wherein the first directional control valve is configured to activate the first plurality of brake actuators and block the second plurality of brake actuators in response to the first directional control valve being in the closed position,
wherein the first directional control valve is configured to activate the first plurality of brake actuators and the second plurality of brake actuators under the same pressure in response to the first directional control valve being in the open position, the first directional control valve being in the open position in response to an input brake load being greater than a threshold brake load.

11. The braking system of claim 10, wherein the brake control module includes a first servo valve fluidly coupled to the first brake cavity and to the second brake cavity.

12. The braking system of claim 11, wherein the first directional control valve is configured to block a hydraulic fluid from activating the second plurality of brake actuators within the second brake cavity and to connect the second plurality of brake actuators to a hydraulic fluid return reservoir in response to the input brake load being less than the threshold brake load.

13. The braking system of claim 12, wherein the first directional control valve is configured to route the hydraulic fluid to the second brake cavity in response to the input brake load being greater than the threshold brake load.

14. The braking system of claim 13, wherein the brake control module includes a second servo valve fluidly coupled to a second brake mechanism coupled to a second wheel.

15. The braking system of claim 14, further comprising a second directional control valve disposed between the second servo valve and the second brake mechanism.

16. The braking system of claim 15, wherein the first plurality of brake actuators is interspaced between the second plurality of brake actuators.

17. The braking system of claim 16, wherein the threshold brake load translates to a hydraulic pressure within a range from about 200 psi to about 400 psi.

18. A method of braking a vehicle having a brake stack connected to a wheel, comprising:
applying an input brake load to a braking system having a first plurality of brake actuators and a second plurality of brake actuators operably coupled to the brake stack and powered by a brake control module;
activating the first plurality of brake actuators in response to the input brake load being less than a threshold brake load, including commanding a first pressure be applied to the first plurality of brake actuators and commanding that zero pressure be applied to the second plurality of brake actuators; and
activating both the first plurality of brake actuators and the second plurality of brake actuators in response to the input brake load being greater than the threshold brake load, including commanding that a second pressure be applied to both the first plurality of brake actuators and the second plurality of brake actuators.

19. The method of claim 18, wherein the brake control module includes a first servo valve fluidly coupled to the first plurality of brake actuators and a second servo valve fluidly coupled to the second plurality of brake actuators.

20. The method of claim 18, wherein a directional control valve is disposed between the brake control module and the second plurality of brake actuators and configured to activate the second plurality of brake actuators in response to the input brake load being greater than the threshold brake load.

* * * * *